US010417925B2

(12) United States Patent
Klante (10) Patent No.: US 10,417,925 B2
(45) Date of Patent: Sep. 17, 2019

(54) GUIDED TOUR AUDIO COMMUNICATION SYSTEMS HAVING OPTICAL READER PROGRAMMING

(71) Applicant: Wolfgang Michael Klante, Fort Lauderdale, FL (US)

(72) Inventor: Wolfgang Michael Klante, Fort Lauderdale, FL (US)

(*) Notice: Subject to any disclaimer, the term of this patent is extended or adjusted under 35 U.S.C. 154(b) by 206 days.

(21) Appl. No.: 15/588,628

(22) Filed: May 6, 2017

(65) Prior Publication Data

US 2017/0323575 A1 Nov. 9, 2017

Related U.S. Application Data

(60) Provisional application No. 62/333,100, filed on May 6, 2016.

(51) Int. Cl.
| | | |
|---|---|---|
| G09B 5/00 | (2006.01) |
| G09B 5/04 | (2006.01) |
| G06F 3/16 | (2006.01) |
| G06F 17/28 | (2006.01) |
| G06K 7/10 | (2006.01) |

(Continued)

(52) U.S. Cl.
CPC ............. G09B 5/04 (2013.01); G06F 3/165 (2013.01); G06F 17/28 (2013.01); G06F 17/289 (2013.01); G06K 7/10386 (2013.01); G09B 29/006 (2013.01); G09B 29/007 (2013.01);

(Continued)

(58) Field of Classification Search
CPC . G09B 5/125; G09B 5/04; G09B 5/06; G09B 5/065; H04W 4/00; G06F 3/0482; G06F 3/0484; G06F 16/27
See application file for complete search history.

(56) References Cited

U.S. PATENT DOCUMENTS

| | | | |
|---|---|---|---|
| 4,845,751 A | 7/1989 | Schwab | |
| 5,929,848 A * | 7/1999 | Albukerk | G06K 17/0022 340/10.6 |

(Continued)

FOREIGN PATENT DOCUMENTS

| | | |
|---|---|---|
| CN | 2836164 Y | 11/2006 |
| CN | 201060665 Y | 5/2008 |
| CN | 204204373 U | 3/2015 |

Primary Examiner — Peter R Egloff
(74) Attorney, Agent, or Firm — Allen F. Bennett; Bennett Intellectual Property (57) ABSTRACT

Devices and methods for providing commentary for multiple points of interests utilize audio communication devices having an optic code reader, a microcontroller, a transmitter/receiver, a storage module and a speaker and/or headphone jack. Two or more audio communication devices may be synced to the same channel. A primary audio communication device sends a signal that triggers a dependent audio communication device to play a prerecorded commentary regarding a selected point of interest in a language selected by a person using the dependent audio communication device. A map having icons representing points of interest includes optic codes embedded within the icons. When an audio communication device scans an icon with an optic reader, a triggering signal causes the audio communication device and any dependent audio communication devices to play a corresponding commentary and a language selected by a user.

5 Claims, 8 Drawing Sheets

(51) Int. Cl.
*G09B 29/10* (2006.01)
*H04R 3/12* (2006.01)
*H04R 27/00* (2006.01)
*G09B 29/00* (2006.01)

(52) U.S. Cl.
CPC ............ *G09B 29/106* (2013.01); *H04R 3/12* (2013.01); *H04R 27/00* (2013.01); *H04R 2420/07* (2013.01)

(56) References Cited

U.S. PATENT DOCUMENTS

| | | |
|---|---|---|
| 7,130,742 B2 | 10/2006 | Kobuya et al. |
| 7,240,108 B2 | 7/2007 | Smith, Jr. et al. |
| 7,962,284 B2 | 6/2011 | Cutitta, II |
| 8,090,459 B2 | 1/2012 | Hsu |
| 9,143,881 B2 | 9/2015 | Fan et al. |
| 2002/0011951 A1 | 1/2002 | Pepin et al. |
| 2009/0305219 A1* | 12/2009 | Stuempfle ............ G09B 5/06 434/365 |
| 2010/0096443 A1 | 4/2010 | Maloney |
| 2011/0301835 A1 | 12/2011 | Bongiomo |
| 2014/0108137 A1* | 4/2014 | Kuri ............ G01C 21/20 705/14.49 |
| 2014/0297259 A1 | 10/2014 | Kruse et al. |
| 2014/0347973 A1* | 11/2014 | Yu ............ H04W 24/04 370/216 |
| 2016/0283050 A1* | 9/2016 | Tomaszewski ....... G06F 3/0482 |

\* cited by examiner

GUIDED TOUR AUDIO COMMUNICATION SYSTEMS HAVING OPTICAL READER PROGRAMMING

CROSS-REFERENCE TO RELATED APPLICATIONS

This application claims priority to U.S. Provisional Application Ser. No. 62/333,100 filed on May 6, 2017, the contents of which are hereby incorporated in their entirety.

STATEMENT REGARDING FEDERALLY SPONSORED RESEARCH OR DEVELOPMENT

Not Applicable.

NAMES OF PARTIES TO A JOINT RESEARCH AGREEMENT

Not Applicable

REFERENCE TO SEQUENCE LISTING, A TABLE, OR A COMPUTER PROGRAM LISTING APPENDIX SUBMITTED ON A COMPACT DISC AND INCORPORATION-BY-REFERENCE OF THE MATERIAL

Not Applicable.

COPYRIGHT NOTICE

Not Applicable

BACKGROUND OF THE INVENTION

Field of the Invention

The present invention relates to devices and systems for providing tourist and sightseeing information. More particularly, the invention relates to independent portable devices for providing commentary regarding points of interest using a map and directly connected devices to provide an enhanced tour experience capable of being coupled using an integral optical interface.

Description of the Related Art

Tourism is a large and ever-growing industry that feeds local economies, enhances people's lives and creates countless jobs within the travel industry. For tourists traveling to a new country or region, researching and finding all of the points of interest on a vacation can be daunting. It is therefore common for vacationers to hire a tour guide to help them enjoy their vacation. It is also common for the travel industry itself to offer a variety of two or guides and types of tours as part of an overall travel plan. For example, oceangoing and river-going cruise ships often coordinate with local tour guides to simplify the vacation planning process for its customers.

Vacationers and tourists often participate in group experiences, such as, for example, guided tours of museums, historical locations, or other places or items of interest. During a group experience, one or more persons (e.g., tour guides, presenters, persons in the group with questions or comments, etc.) can be speaking or otherwise presenting information to the group of people.

There are often impediments that interfere with at least some people in the group being able to hear or receive the information being presented during a tour. For example, a tour guide may be leading a group of people in a tour of a point of interest, wherein the tour guide is speaking to the group and providing information while walking with the group through the point of interest. For a variety of reasons, such as the distance between the tour guide and some members of the group, the volume of the tour guide's voice, ambient noise in the area of the group, others in the group speaking at the same time as the tour guide, etc., some members of the group are not able to hear or receive the presentation by the tour guide, or at least have difficulty in hearing or receiving the presentation.

A tour may involve a number of points of interest over a relatively large area (e.g., a tour of New York City), In such situations, hearing the tour guide speak over the noise of the city can be even more difficult, particularly if the person is near the back of the group away from the tour guide. Further, there can be a number of different tour groups visiting the same landmark at the same time, which can make it even more difficult to hear the tour guide of a person's particular group, as the tour guides of the tour groups can be speaking loudly at the same time. Also, if there are a number of different tour groups with a number of different flags, it can be difficult for a person to identify to which group the person belongs.

Another issue is that various tour members may come from different countries having different languages, and such tour members may not speak the same language as the tour guide. In other instances, a person may be participating in an individual tour of a point of interest (e.g., museum, aquarium, landmark, etc.). Such an individual will have limited sources of information and commentary during his or her tour. For example, the person may have a brochure and/or map for aiding in touring or browsing through the points of interest based on the information in the brochure. A person can sometimes rent a wireless device (e.g., wireless device with earphones) that can act as an electronic tour guide and can guide the person through the point of interest. In the case of the latter, the wireless device may provide background explanations, historic illustrations, directions relating to the point of interest (e.g., directions to guide the person through a building), or other information relating to the point of interest. In both of these instances, there is no interaction feature provided to enable the person to solicit information, provide feedback, or otherwise actively interact with the tour experience. While these pre-recorded audio tracks are informative, it is difficult to combine them with an actual tour guide and use as an integrated part of a live tour.

In another instance, a tour guide may desire to provide additional description of a point of interest beyond what is being provided by the wireless device of the tour member, or the tour member may desire to personalize the tour by taking notes relating to the tour.

Furthermore, wireless devices are typically fairly limited in their geographic range. They are most commonly used in museums or other highly localized places and must be checked out and checked back in when entering and leaving a location. These devices are also inherently restricted to their location. Most commonly, artwork within a museum will have a number or letter placed on a wall or plaque next to it. A tourist will then enter that number into the wireless device to hear the prerecorded information regarding the artwork. Such a system is impractical for a walking tour of a city simply because a guide creating a pre-recorded tour will not be allowed to place numbers on buildings, sculptures and local landmarks. In addition, many of these headphone devices require connection to a local network.

Tourists wishing to explore an entire city can easily purchase maps and books with copious information on local landmarks. However, cities with a wide variety of landmarks and points of interest may have so much history and background information that it is difficult to sift through. Often, tourists have a particular interest in a particular subject. For example, tourists in Prague may be particularly interested in the city's rich and vast Jewish history. Tourists in Italy or France may have a particular interest in locations featured in popular books such as "The Da Vinci Code" by Dan Brown. Travelers to Vienna may be more interested in landmarks relating to classical music and the fine arts. In these instances, a map, brochure or prerecorded tour may include far more information than is necessary for selectively touring a city and will usually provide insufficient detail regarding the points the tourist is most interested in.

Tour guides can use technology such as a walkie-talkie for communicating with tourist through a city to overcome noises and be heard clearly. However, this does not allow a tour guide to comment on points of interests in more than one language. Attempting to provide commentary in several languages is time-consuming and impractical.

River cruises have become increasingly popular. It is common for vacationers to sit on the deck of a boat and view points of interest while recumbent. Such cruises can last hours and it is impractical for a tour guide to remain on a boat deck for the entire day to comment on occasional sites. Left on their own, tourists and vacationers may float past important landmarks without realizing what they are seeing or without even realizing that an object being viewed has any significance. A river cruise can include a broadcast system to provide commentary throughout the trip. However not all passengers will be interested in all sites and as a result much of the publicly broadcast commentary may be more distracting than helpful.

When touring a city, numerous cell phone applications are available for use in researching various points of interests and for providing interesting commentary. However, these applications typically require access to a Wi-Fi or a cellular network which can limit them. In addition, they often require navigating through several menus and may require typing. While this comes naturally to younger people, many tourists are not as familiar with this type of technology and encounter substantial difficulty in attempting to navigate through a cell phone application. This may also be inconvenient with large groups or even a family preoccupied with monitoring children. Previous solutions use for connecting a device to each other mechanical buttons and switches, or externally connected computer systems. This coupling method are not user friendly in general.

DECT systems are still widely used for short range wireless headsets connected to a base station in a telephone system. However, they are not typically utilized for use as audio systems for tours and tour guides. Typically, tours and tour guides either use systems having self-contained memory storage accessed and operated by a tourist, or a Wi-Fi system is used. Wi-Fi is typically preferred because it is ubiquitous and numerous software and protocols are designed for utilizing Wi-Fi and common devices such as smart phones to access and play audio and/or video recordings on demand by a tourist operator. Bluetooth® is also commonly used. These methods are more commonly used because they have become so commonplace.

However, Wi-Fi also offers many disadvantages. For example, Wi-Fi systems utilize a relatively narrow wavelength bands. This combined with their ubiquity can result in overuse of Wi-Fi bandwidths and thus interference. Wi-Fi also generally requires numerous hotspots, repeating stations, routers, buses and other devices to provide consistent reliable signals. Wi-Fi signal degradation is further increased in crowded areas because human body fluids typically dampen the signals. Use of Wi-Fi also poses security risks. Public Wi-Fi is susceptible to hacking. Furthermore, tourists are often outside their home countries and may not have service plans at a particular location where he tours conducted. This may require tourist to purchase a local SIM or telephone service plan. It is also easy to inadvertently use services that include hefty usage fees. Thus, although Wi-Fi technologies are ubiquitous and easily utilize, they pose several dangers. In addition to these problems, a company may wish to avoid using easily hacked networks to transmit proprietary material. Two are companies charge a modest fee for providing tourist services that include information regarding various points of interest. They understandably do not wish persons who have not paid for their services to pick up and enjoy the signals they emit to paying tourists.

As mentioned above, DECT communications systems allow interference-free wireless operation to around 100 meters (110 yards) outdoors, much less indoors when separated by walls. Operates clearly in common congested domestic radio traffic situations, for instance, generally immune to interference from other DECT systems, Wi-Fi networks, video senders, Bluetooth technology, baby monitors and other wireless devices. However, DECT systems typically include a stationary base station and a plurality of handheld devices that communicate only with the immobile base station and not with each other. The base station and the handheld devices must also be securely coupled utilizing a single reserved channel. It is therefore impractical to use these systems within a Museum. Because of the short range, tourists using the handheld devices would have to re-couple to a new base station for every room, and in some cases every exhibit, in a Museum.

The above-described deficiencies of today's systems are merely intended to provide an overview of some of the problems of conventional systems, and are not intended to be exhaustive. Other problems with the state of the art and corresponding benefits of some of the various non-limiting embodiments may become further apparent upon review of the following detailed description.

In view of the foregoing, it is desirable to provide devices and systems for allowing a tour guide to effectively communicate with an entire large group of tourists in more than one language simultaneously. It is also desirable to provide an efficient means for individuals to tour locations alone while having easy access to useful and informative commentary. It is also desirable to provide a means for alerting tourists to a point of interest and allowing the tourists to decide whether he or she wishes to hear commentary.

BRIEF SUMMARY OF THE INVENTION

Disclosed is a system, methods and devices for a radio digital system that includes audio communication devices for providing commentaries relating to points of interests in response to a triggering signal. The devices are coupled using an optical user interface.

In one embodiment, An optical user interface is used for coupling two or more DECT transmitters and receivers among each other. The optical user interface (for example, OID reader, QR code reader) interprets integrated codes in images and triggers integrated function sequences in the device. This method, among other things, initiates the process for coupling one or more DECT devices to one another.

In another embodiment, a primary audio communication device has a body having two opposing handgrip depressions, a speaker, a headphone Jack, a recharging panel, indicator lights, a power button, a volume adjusting switch, an optic reader, a microphone, a microcontroller in electrical communication with the optic reader, a transmission module and a storage module.

In another embodiment, a dependent audio communication device has a body having two opposing handgrip depressions, a speaker, a headphone Jack, a recharging panel, indicator lights, a power button, a volume adjusting switch, an optic reader, a microcontroller in electrical communication with the optic reader, a transmission module and a storage module, wherein the storage module stores commentary regarding at least one point of interest in at least one language.

In another aspect, a map has a plurality of color bars having embedded optic codes for selecting a channel for use with the primary audio communication device and the dependent audio communication device, a plurality of flags having embedded optic codes for selecting a preferred language, and a plurality of icons, each icon representing a point of interest and having embedded optic codes corresponding to commentaries relating to the point of interest.

In another embodiment, a dependent audio communication device is synced to the same channel as a primary audio communication device and receives triggering signals from the primary audio communication device that causes the dependent audio communication device to play prerecorded commentaries and a language selected by a person using the dependent device.

In another embodiment, a digital communication system for guided tours transmits speech as well as music in all contexts. The invention provides a digital communication system for guided tours. The guide speaks into a transmitter and guests hear via their receivers.

In another embodiment, a guide touches a photo on a map. The user hears the commentary in his or her selected language. A transmitter can be used as a reader in combination with special maps. The guide points the transmitter on a picture on the special map that triggers a recorded commentary on the guest's receiver. The guest can choose the language in which he/she wants to listen.

In another embodiment, audio pen receiver can be used as a map reader for individual tours. When the device scans a photo, it triggers the relevant commentary.

In another embodiment, the invention equips a vehicle such as a bus or an entire ship with a wireless audio system. A receiver emits a visual and vibrating signal when a point of interest is near, triggered by GPS.

One embodiment of the invention provides innovative technology to enhance a tourist's experience without interferences. Up to 7600 separate tour groups can be guided in the same place at the same time without interference. Systems can be rented for a single day, or for as long as a tour lasts.

It is therefore an object of the present invention to provide systems and methods for providing prerecorded and live commentary regarding points of interests using an easy-to-use audio communication device.

These and other objects and advantages of the present invention will become apparent from a reading of the attached specification and appended claims. There has thus been outlined, rather broadly, the more important features of the invention in order that the detailed description thereof that follows may be better understood, and in order that the present contribution to the art may be better appreciated. There are features of the invention that will be described hereinafter and which will form the subject matter of the claims appended hereto.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram or other generalized form in order to facilitate describing the various embodiments herein.

The term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

The invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Disclosed are devices and systems for improving the dissemination of commentary, music and other audio media to one or more individuals regarding multiple points of interests. Audio communication devices capable of providing audio information to one or more individuals may be used in conjunction with a tour guide, as a standalone portable personal audio communication device, in combination with a map or other physical media, or in combination with a GPS system and a local network to enhance tourism, vacationing, and other activities around one or more points of interests in accordance with the principles of the invention.

The devices and systems include using an optical reader programming communication devices. For example, an optical code is scanned by an optical reader of the communication device. The optical code instructs the communication device to couple with two or more other transmitting and/or receiving devices. Using optical codes embedded within images to instruct communication devices to perform certain functions simplifies the otherwise complicated process of coupling to communication devices. The method of using instructions corresponding to optical codes also vastly simplifies the process of allowing an operator, such as a tourist, to select a preferred language.

The system provides at least four functionalities in accordance with the principles of the invention, including a) Group Guiding—a digital communication system for guided tours. It transmits crystal-clear speech as well as music in all contexts; b) Guided Tours—The guide touches a photo on the map. The guests will hear the commentary in their selected language; c) Individual Tours—the audio pen receiver can be used as a map reader for individual Tours. Scanning a photo with the device will trigger the relevant commentary; c) GPS Notification—the receiver emits a visual and vibrating signal when a point of interest is near, triggered by GPS; d) No interference—new digital technology allows transmission without any interference from other frequencies. Up to 4,000 groups can user devices in the same place at the same time.

Figure 1:
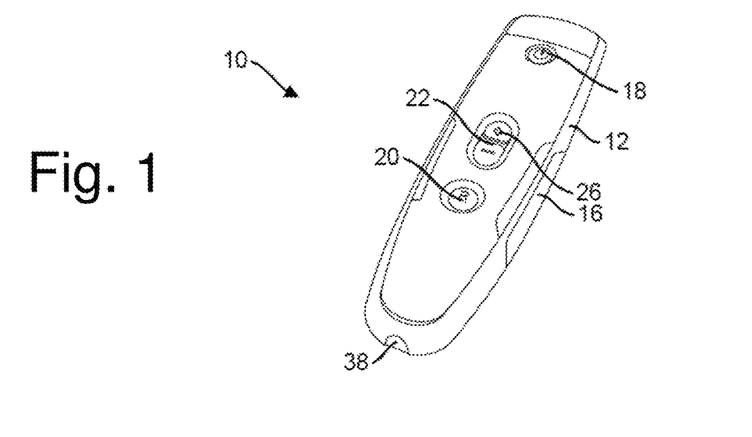
FIG. 1 is a perspective view of an audio communication device in accordance with the principles of the invention.
Figure 2:
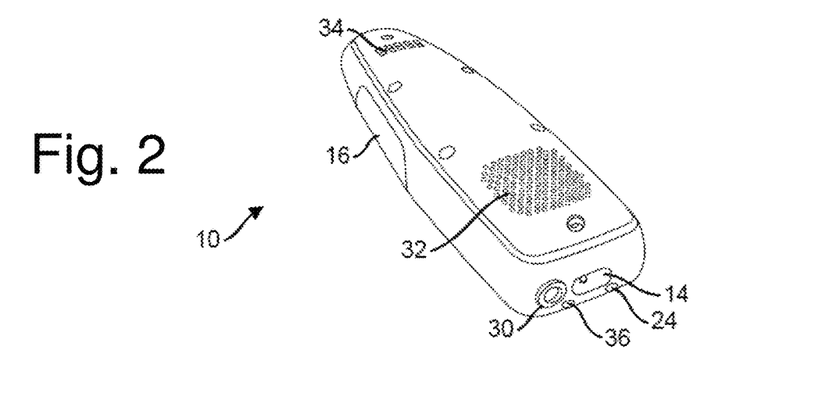
FIG. 2 is another perspective view of an audio communication device in accordance with the principles of the invention.

FIGS. 1 and 2 show an exemplary embodiment of an audio communication device 10 in accordance with the principles of the invention. In this embodiment, the audio communication device 10 has an elongate body 12 configured to fit easily and comfortably within a user's hand, pocket, purse, backpack or the like. The audio communication device 10 includes two opposing depressions 16 on either side to facilitate easy gripping with only a few fingers instead of an entire hand. In this embodiment, the audio communication device 10 includes a through-hole 14 to which a lanyard or similar device may be attached. By using a lanyard, a person may carry the audio communication device 10 about his or her neck, wrist, purse strap, backpack strap or the like.

The audio communication device 10 in this embodiment enjoys a relatively simple design making it both aesthetically pleasing and easy to operate. The audio communication device 10 may be operated utilizing only two switches, specifically a power button 18 and a volume control switch 22. The first button 18 is a power button that turns the device on or off and has embossed on it a symbol commonly used to indicate a power button. An indicator light 24 glows when the device is turned on and emits no light when the device is turned off. The volume control switch 22 in this embodiment is a rocker switch and allows a user to adjust the volume of the speaker or headphones. The volume adjusting rocker switch 22 has a first-section 26 that increases the devices volume when depressed, and a second section 28 that decreases the volume. In this embodiments, the first section 26 has a "plus" symbol and the second section 28 has a "minus" symbol to indicate their functions. An optional button 20 includes an embossed letter "R" to indicate its function of rewinding and audio message being played.

The audio communication device 10 also includes a headphone jack 30 that may be located adjacent to the through-hole 14. This may be a beneficial configuration, particularly when the device 10 is hung about a person's neck by a lanyard and headphones are used for listening. If a user does not wish to use headphones, the audio communication device 10 includes a speaker 32 that may allow more than one person to listen to the device simultaneously. A charging mechanism 34 allows the device to be affixed to a charging station so that internal rechargeable batteries may be recharged when the device is not in use. A second indicator light 36 may be used to indicate when a battery is running low on power and in need of recharging. The charging mechanism 34 may optionally include a mechanism for transferring data. For example, it may be desirable to utilize an audio communication device having a USB port as a charging mechanism that allows transfer to and from the device of information in a computer readable form.

The audio communication device 10 also includes an optical reader 38. The optical reader 38 scans and reads optical codes printed on various physical media, as will be explained in more detail below. The optical reader may be a laser scanner, an infrared reader, or other device used to scan optical codes. Optionally, an audio input, for example a microphone, may be incorporated into the audio communication device. A microphone may be used along with a speaker or headphone to allow the audio communication device 10 to operate much like a "walkie-talkie," sending and receiving audio transmissions in real time. A microphone may be used by a tour guide to transmit commentary to one or more tourists while visiting a point of interest. Optionally, the microphone may be utilized by a tourist to ask a question or comment regarding information provided by the tour guide or the commentary stored in the device which a tourist has listened to. Optionally, a microphone may also be used in place of or in addition to the optical reader 38 to input information to the audio communication device 10, as explained in more detail below.

Figure 3:
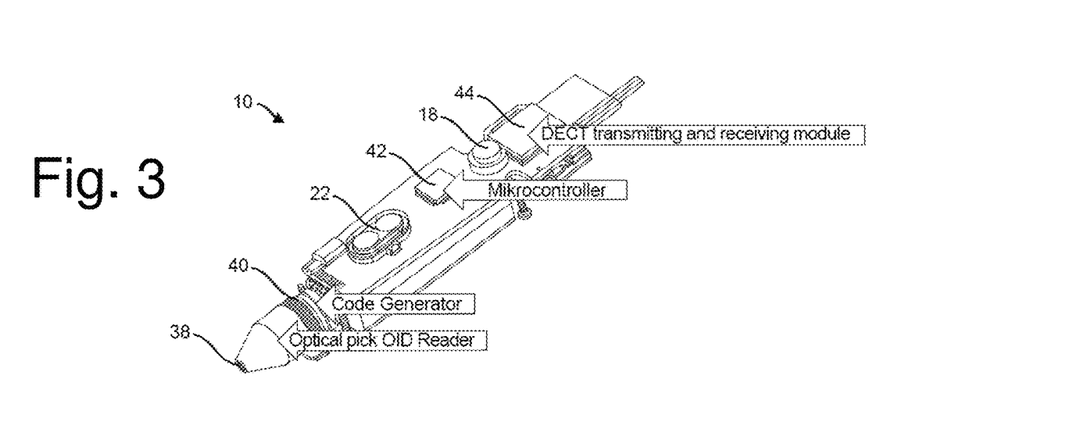
FIG. 3 is a cutaway view of the components of an audio communication device in accordance with the principles of the invention.

FIG. 3 shows some of the internal components of an audio communication device 10. The device 10 includes an optical reader 38 in communication with a translation module 40 that translates an optic code read by the optical reader 38 into an electronic signal which is then sent to the microcontroller module 42. The microcontroller module 32 in turn sends a signal to the transmitter module 44 that then transmits a signal, sometimes a triggering signal, to one or more other audio communication devices.

Preferably, an audio communication device 10 is "streamlined" in appearance, size and functionality. The exemplary audio communication device 10 has no monitors or screens and relatively few controls. Many people, in particular those who do not use computers on a daily basis and older people who did not grow up with computers or touchscreens, are less familiar with computer devices. Handheld devices are also typically small and video screens necessarily utilize small fonts which can be difficult to read. Tourists often do not wear reading glasses, thus making small fonts on small screens impractical. Also, utilizing a device for providing information that requires navigating menus and using touchscreens can be needlessly complicated for simpler tasks.

In addition, smart phones and similar devices are relatively fragile. Touchscreens and simpler view screens crack or break easily. Furthermore, many of these devices require a consistent, strong signal from a Wi-Fi, cellular or other network they must be integrated with in order to be utilized. Thus the audio communication device 10 uses no touchscreens, has only power and volume adjustment, and a user such as a tourist can only input instructions through an optical reader. A rewind switch is optional and may not be included. The simple design allows anyone to easily and effectively use the device and requires almost no instruction on proper use.

Figure 4:
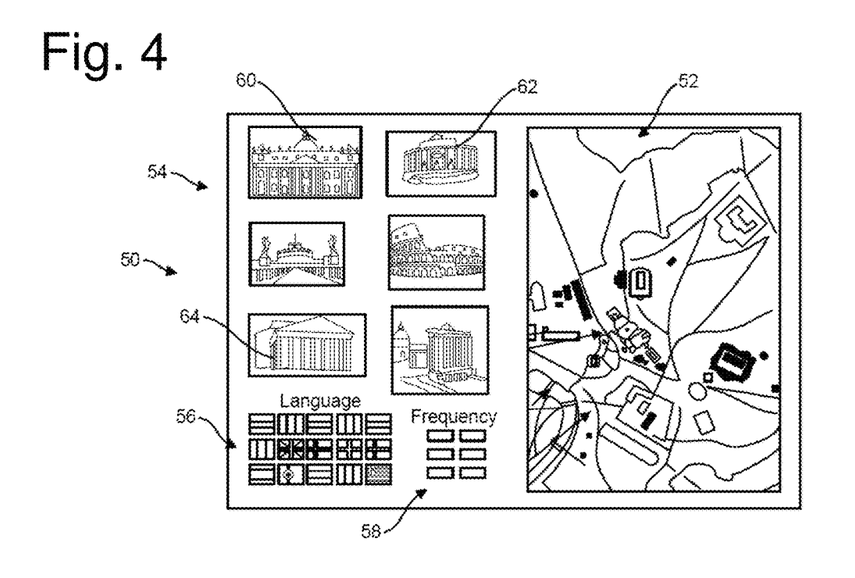
FIG. 4 is a top plan view of a map in accordance with the principles of the invention.

FIG. 4 shows a map 50 in accordance with the principles of the invention. The map 50 includes an actual map 52 showing the layout of an area having several points of interest. The map 50 also includes several icons 54 which may be actual photographs of points of interests as shown in FIG. 4, or may alternatively be diagrams, outlines, graphic art, clipart or other images representing various points of interests. The exemplary map 50 of FIG. 4 includes a map 52 of the city of Rome, and images of, inter alia, the Vatican 60, Trevi fountain 62 and the Pantheon 64. In this embodiment, the icons 54 are adjacent to the map 52 of the city. Optionally, the icons 54 may be superimposed on the city map 52 itself at the locations of the different points of interest.

The map 50 also includes a collection of flags 56 representing different languages. An assortment of color bars 58 may be used to synchronize channels used by one or more audio communication devices. Each of the icons 54, flags 56 and color bars 58 have optical codes embedded within them but not visible to an unaided naked eye.

Figure 5:
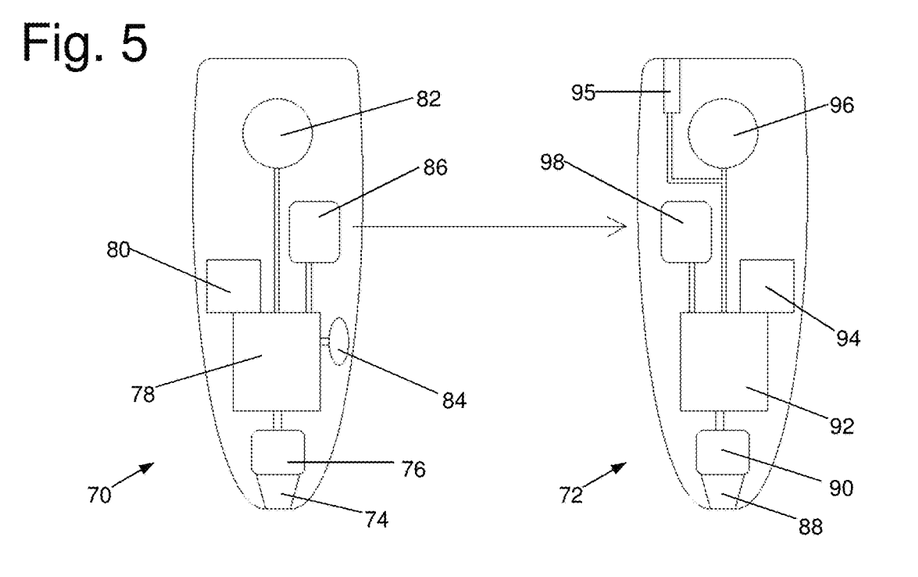
FIG. 5 is a diagrammatic view of a primary audio communication device and a dependent audio communication device.

FIG. 5 shows two alternative embodiments of audio communication devices 70 and 72 that may be used together. Device 70 is a primary audio communication device and device 72 is a dependent audio communication device. The primary audio communication device 70 has features not generally found on a dependent audio communication device 72. However, those skilled in the art will appreciate that the primary audio communication device 70 may be used as a dependent audio communication device by limiting and/or modifying some of its functionality.

Primary audio communication device 70 includes an optical reader 74 in communication with a translation module 76, which in turn is in electrical communication with a microcontroller module 78. The microcontroller module 78 is in electrical communication with a storage module 80, a speaker 82, a microphone 84 and a transmitter 86. The dependent audio communication device 72 also includes an optical reader 88 in communication with a translation module 90, which in turn is in electrical communication with a microcontroller module 92. The microcontroller module 92 is in electrical communication with a storage module 94, a speaker 96 and a transmitter 98. The dependent audio communication device 72 also includes a headphone jack 95. Generally, the transmitter 86 of the primary device 70 will transmit voice or signals to the transmitter 98 of the dependent device 72.

The primary audio communication device 70 and the dependent audio communication device 72 may interact in a number of ways to facilitate a thorough, simple and enjoyable tour and tour guide experience. When the two devices are to be used together, they may be keyed to the same channel using their optical readers 74 and 88 to scan the same color bar on a map 50. When the devices scan one of the color bars 58, the optical readers 74 and 88, and their respective translation modules 76 and 90 send signals to the microcontroller modules 78 and 92. The data storage modules 80 and 94 include a library of available channels and corresponding optic codes. The microcontroller modules 78 and 92 will adjust the channel used by the transmitters 86 and 98 to the channel indicated by the optic code in the color bar scanned. In this fashion, both the primary device 70 and dependent device 72 may be automatically coupled via the same channel in a simple manner that requires almost no instruction and no knowledge of how the devices operate.

The dependent audio communication device 72 may then also be adjusted to select a language in a similar fashion. The operator of the dependent device 72 scans one of the flags 56 on the map 50. Each flag has an optic code corresponding to the language represented by the flag. When the dependent device 72 reads and interprets the optic code of a flag, the microcontroller module is programmed to play only audio files in the language selected. This allows the operator of the dependent device to choose any available language whether or not any other persons participating in a tour also speak that language.

Figures 6, 7:
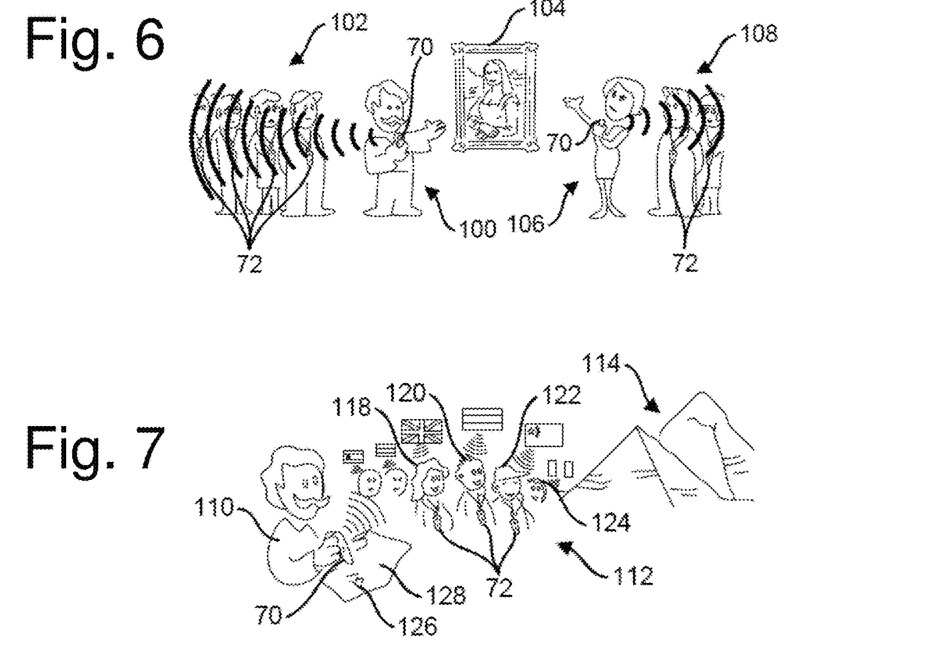
FIG. 6 is a perspective view of a method of using audio communication devices in accordance with the principles of the invention.
FIG. 7 is a perspective view of another method of using audio communication devices in accordance with the principles of the invention.

FIGS. 6-9 show examples of various uses of the audio communication devices described above in accordance with the principles of the invention. FIG. 6 shows an example of a first method of utilizing a digital communication system and audio communication devices. A first tour guide 100 utilizes a digital audio communication transmitting device 70 while guiding a tour group 102 through a museum. Each member of the tour group 102 has a dependent digital audio communication playback device 72 and is listening using earphones connected to the dependent playback communication device's headphone jack 95. Prior to beginning the tour, both the tour guide 100 and the members of the tour group 102 synced their respective devices by scanning the same colored bar having an optical code for a transmission channel. The tour guide 100 provides commentary regarding a point of interest 104, which is only heard by his tour group 102.

Simultaneously, a second tour guide 106 also provides commentary on the point of interest 104 using another digital audio communication transmitting device 70 while conducting her tour group 108 through the same museum. The second tour guide 106 has synced her transmitting device 70 with the dependent playback devices 72 worn by her tour group to a common channel. However, the second tour guide 106 and her tour group 108 have synced their devices to a different channel by scanning a different color bar than the one scanned by the first tour group 102 and their tour guide 100. As a result, both tour groups 102 and 108 observed the same point of interest 104 while listening only to commentary from their respective tour groups. As a result, neither tour group is distracted or interrupted by the wrong tour guide. In addition to convenience, this is also useful when two very different tour types are being conducted. Tour group 102 may be more interested in the historic significance, while the tour group 108 may be an art class more interested in the artistic significance of a point of interest 104.

FIG. 7 shows an example of a second method of utilizing a digital communication system and an audio communication device in accordance with the principles of the invention. Here, a tour guide 110 conducts a tour group 112 while visiting a point of interest 114. In the example of a first method shown in FIG. 6, the point of interest 104 is a painting inside a museum. The point of interest 114 in FIG. 7, on the other hand, is a large outdoor structure, specifically Egyptian pyramids. The tour guide 110 uses a digital audio communication transmitting device 70, while the members of the tour group 112 each have a dependent digital audio communication playback device 72. The tour group 112 and the tour guide 110 have synced their audio communication devices to the same channel using the color bars as explained above. In addition, each of the members the tour group 112 have preselected a preferred language, represented by different flags. For example, member 118 has selected English, member 120 has selected German, member 122 has selected Chinese and member 124 has selected French. During the tour, the tour guide 110 scans an icon 126 on a map 128 which includes an optic code. When the digital audio communication transmitting device 70 reads the optic code embedded in icon 126, it transmits a triggering signal to each of the dependent digital audio communication playback devices 72 instructing them to play prerecorded commentary relating to the point of interest 114 corresponding to the icon 126. Each of the dependent digital audio communication playback devices 72 receives the instruction to play commentary corresponding to the icon 126 and plays the selected commentary in the language preselected by the individual members. As a result, the entire tour group enjoys the same commentary regarding the point of interest 114 in each of their preferred languages simultaneously. The tour guide 110 may also optionally provide commentary through the microphone of the primary audio communication device 70 that is broadcast directly to each of the standard audio communication devices 72. Optionally, the primary device 70 may play the selected commentary through speaker 82 for the benefit of the tour guide 110.

This second method shown in FIG. 7 is possible because each of the dependent devices 72 may be prepared prior to being distributed to the tour groups by having commentary for all of the points of interest on a tour, such as all the points of interest shown on a map like the map in FIG. 4, uploaded into the storage module 94 of the digital audio communication playback devices 72. Thus any member of the tour group may utilize any of the dependent devices 72. Prior to starting the tour, the tour guide selects a channel and scans a color bar corresponding to that channel and instructs the members of the tour group 112 two also scanned the same color bar. The tour guide 110 then instructs the members of the group 112 to select their preferred language by scanning the appropriate flag with their dependent playback devices 72. The tour guide carries both a transmitting device 70 and a map 128. When a particular point of interest is reached, the tour guide simply scans the appropriate icon and the commentary is automatically played for the entire tour group in their preferred language. In this manner, the members of the tour group 112 do not need to manipulate or adjust their devices at all throughout the tour. This method does not require the primary device 70 to have any of the commentaries loaded in its storage module 80 because the commentaries are all stored on the dependent devices 72. Another advantage of this is that the dependent devices 72 do not need a strong reliable continuous signal from a network. A simple signal is transmitted directly from the primary device 70 to the dependent devices 72 which acts only as a trigger to initiate play of the commentary associated with the point of interest selected. The dependent devices 72 respond to this trigger by playing the commentary indicated by the signal received from the primary device 70 in the language already selected by the operator of the dependent device 72.

Figure 8:
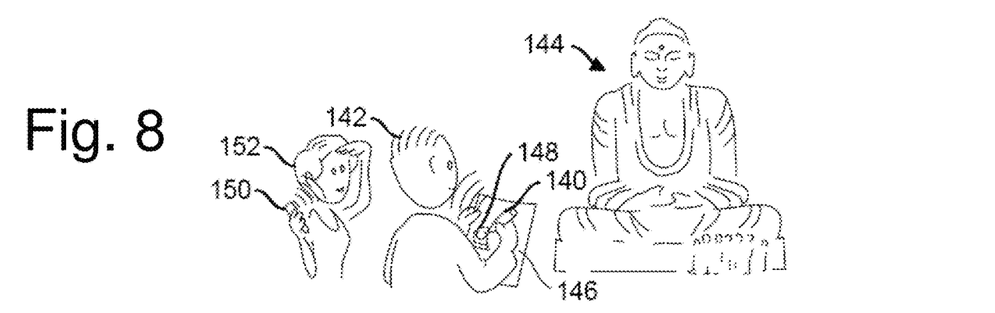
FIG. 8 is a perspective view of another method of using audio communication devices in accordance with the principles of the invention.

FIG. 8 shows an example of a third method of utilizing an audio communication device 140 in accordance with the principles of the invention. This third method allows an individual 142 to hear commentary on various points of interest in the absence of a tour guide. The individual 142 first locates a point of interest 144, in this example a statue of Buddha. The individual 142 may use a street map located on a map 146, similar to the map 50 of FIG. 4, to find the point of interest 144. The individual may then use the device's optic scanner to scan an icon 148 corresponding to the point of interest 144. The device 140 will then play the commentary corresponding to the point of interest 144 and a language selected by the individual 142. The language may be selected before beginning the tour, or at any point during the tour by scanning an icon such as a flag having an embedded code instructing the device 140 to play commentaries in a language corresponding to the flag. Optionally, the audio communication device 140 may transmit a signal to a dependent audio communication device 150 instructing it to play the same commentary in the language selected by the second individual 152. The passengers 170 and 172 may also optionally elect not to hear any commentary.

Figure 9:
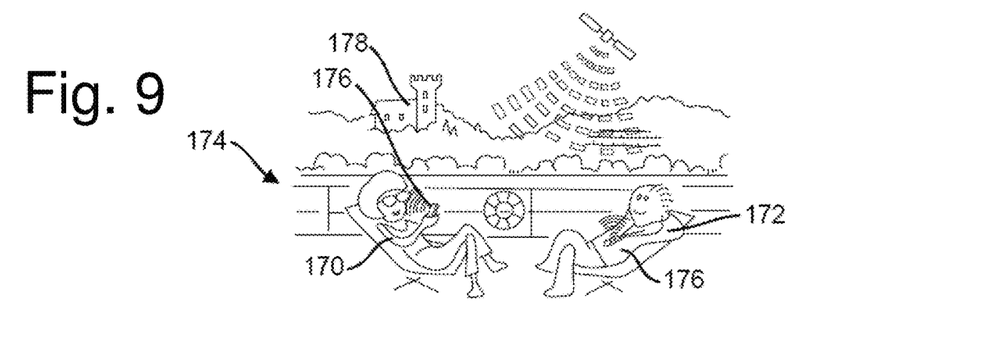
FIG. 9 is a perspective view of another method of using audio communication devices in accordance with principles of the invention.

FIG. 9 shows an example of a fourth method of utilizing an audio communication device in accordance with the principles of the invention. This embodiment includes the use of a system on board a cruise ship or other vehicle. Passengers 170 and 172 on a cruise ship 174 each have a dependent audio communication device 176 synced to the same channel used by an onboard system. The passengers 170 and 172 have also selected their preferred languages. The onboard system is similar to a digital audio communication transmitting device of FIGS. 6-8. When the onboard system detects via GPS, triangulation or another method, that the ship 174 is within the vicinity of a point of interest 178, it sends a signal to dependent audio communication devices 176 that causes the devices 176 to vibrate and/or for lights on the devices to blink in order to alert the passengers 170 and 172 that a point of interest 178 is near. The passengers 170 and 172 may then elect to hear commentary regarding the point of interest 178. To elect to hear the commentary, the passengers may engage a button or switch on the dependent audio communication playback device 176, or may scan a code with an optic reader. The audio communication playback devices 176 then provide the commentary in the language selected by the passengers. The passengers 170 and 172 may also optionally elect not to hear any commentary. In this exemplary fourth method, none of the operators of audio communication devices actually identify a point of interest. Rather, a moving vehicle, in this case a ship, determines when it is near a point of interest.

Tourists listening to commentary regarding points of interests are not required to view a monitor, make selections from menus or to even know the names of the points of interest they are viewing. Persons with poor eyesight, persons who are not literate, and persons having impairments that limit their abilities to operate computer systems are capable of utilizing methods and devices in accordance with the principles of the invention.

Any suitable method of short range communication may be used to allow dependent audio communication devices and primary audio communication devices to communicate with one another. This may include using a wide or local area network, a cellular network, Bluetooth, wi-fi, radio systems or the like. One communication system that may be preferred is a Digital Enhanced Cordless Telecommunications, or "DECT" system developed for cordless phone technology. A DECT system affords a larger coverage area than Bluetooth and does not rely upon on a substantial infrastructure required for Wi-Fi and cellular networks. It works with systems in accordance with the principles of the invention that only require short range communication directly between the devices. Because dependent audio communication devices store all of the audio commentary in a variety of languages, only very simple triggering signals are required to be transmitted between devices. Methods in accordance with the principles of the invention also only require unidirectional communication. Typically, a dependent audio communication device only needs to receive signals and it is not necessary for them to emit signals. Unidirectional signaling is commonly thought of as inferior to two-way systems because it provides greater interaction. However, for the present invention, two directional communication is unnecessary and overly complicated.

The maps used in accordance with the principles of the invention may come in a wide variety of forms that may allow for mixing and matching of commentaries regarding many different points of interest. For example, several different tours of the city may each have their own map and users of the devices may choose which map they wish to use according to their personal preferences.

Exemplary points of interest above include artwork in a museum and ancient architecture. However, a point of interest can be any objects, structure or location that a tourist or other person may be interested in visiting and learning more about.

For user-friendly coupling, an optical reading head, or optical reader, is used to program the communication devices. By placing the optical reader on an image, the optical reader scans and detects embedded optical codes embedded but not visible in the printed image. These optical codes are interpreted by a microcontroller and then trigger a sequence of commands for coupling with DECT devices, or initiates a new DECT radio network. The often complex steps for coupling of DECT devices can be combined into a sequence of programming instructions that are then associated with a corresponding optical code in a library stored on the storage module of the communication device. As an alternative to this optical coupling in connection with the OID Reader, the device has the possibility of direct group dial by pressing a button. Each time a user presses a button, the user switches to a different channel associated with a different color. The display of the selected group is made via the display of a color and does not have the display of a number. In addition, any time new DECT devices can pair with the active DECT network without the active DECT transmitter must be put into a special pairing mode.

A DECT communication system is used in one preferred embodiment of the invention illustrated in FIGS. 10-17. DECT systems in accordance with the principles of the invention uses encryption, for example, a 64-bit encryption. This prevents unauthorized persons from intercepting a signal from a DECT system. To couple two DECT communication devices to form a DECT system, they must first be coupled. First, a wireless headset establishes an authenticated connection with the base. This requires a number of electric signal "handshakes" and creates a secure link. Once the DECT system is successfully established, the digital audio communication devices convert audio signals into digital data, encrypts it, and passes only the encrypted data to a coupled device. The transmissions are secure. It is generally very difficult and impractical for an unauthorized user to hack into a DECT system.

DECT systems have limited communication abilities. In particular, a DECT channel may have several devices that receive transmissions, but has only a single base station that emits transmissions. This limits transmissions between separate receiving devices and is typically considered disadvantageous when used among small groups desiring to communicate with each other. DECT system base stations are used as digital audio communication transmission devices and DECT system receivers are used as digital audio communication playback devices. The receivers, used by the tourists, are not capable of communicating directly with each other, but only with the base station. However, this is generally an advantage, not a disadvantage, to a tour guide who wishes to minimize disruptions of the entire tour group caused by a single member and allows the tour guide to keep a tour moving at a desired pace.

DECT systems are also useful for use in the present invention because coupled devices enjoy a reserved channel for transmission. The wavelength range of DECT systems do not overlap with other transmission system such as radio, TV and others. DECT systems typically have a limited range of 100 feet or less. While this is generally viewed as undesirable, it is an ample range for use with even a relatively large tour group. All of these features, the reserved channel, the absence of competing transmission methods and the limited range of coupled DECT devices all result in a very clear, interference free transmission. This is particularly the desirable because many tourists are older and may have difficulty hearing a signal that is not particularly clear. DECT systems generally have about 500 separate, reservable channels. However, it is extremely unlikely that two DECT systems operating the same channel are present within the relatively small range a DECT system transmits over. All of these features of a DECT system are generally considered disadvantageous for communication within a tour group. However, a DECT system is generally preferred in accordance with the principles of the present invention.

Figure 10:
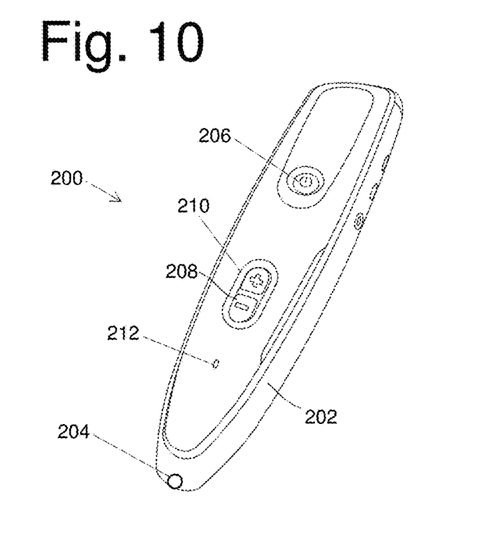
FIG. 10 is a perspective view of a digital audio communication device in accordance with the principles of the invention.

FIG. 10 shows an alternative embodiment of a communication device 200 in accordance with principles of the invention. The communication device 200 includes a body 202, an optical reader 204, a power button 206, a volume controller 208, a connection indicator light 210 surrounding the volume controller 208, and a microphone 212. The communication device 200 also includes an internal microcontroller and storage module, not shown. The communication device 200 also includes a speaker on its back, not shown similar to the speakers shown in the other embodiments.

The storage module of the communication device 200 is used to store various libraries. In one exemplary embodiment, a tour library is constructed from the optical codes embedded in the icons 54 of the map 50 shown in FIG. 4. Each optical code is matched with the corresponding point of interest shown in the icon image in which the optical code is embedded. For example, the icon 60 and FIG. 4 includes an optical code matched to the Vatican.

An audio library is also stored in the storage module. The audio library consists of audio commentaries for many different points of interests, each of which is recorded in several different languages. Each individual audio file corresponds to a single point of interest and a single language. For example, the audio library includes a collection of audio files corresponding to the Vatican, and the collection is made up of several audio files that all provide the same commentary but in different languages.

Figure 11:
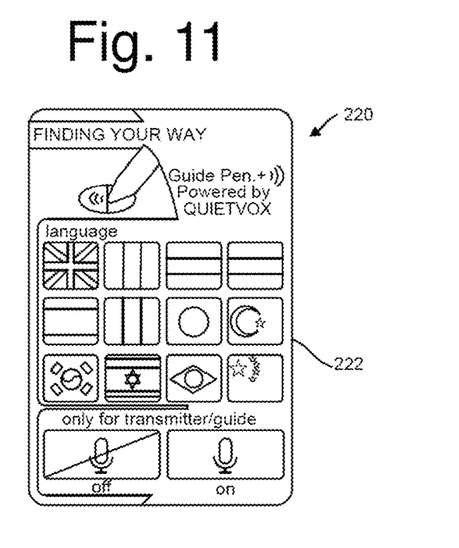
FIG. 11 is a top plan view of a language selecting card in accordance with principles of the invention.

A language library stored in the storage module is constructed by matching optical codes to particular languages. FIG. 11 shows a map 220 associated with the language library. The language map 220 includes several images of national flags 222. Each national flag image 222 has an embedded optical code corresponding to the language spoken in the nation identified. When a tourist using a dependent communication device reads one of the national flag images 222, the microcontroller in the dependent communication device identifies the corresponding language using the language library. The dependent communication device is then automatically programmed to play only the audio commentaries in the audio library in the chosen language.

Once a tourist has programmed a dependent communication device to select audio commentaries only in a particular language, the dependent communication device may be instructed to play specific commentaries corresponding to specific points of interest in two ways.

The first, and simpler, method simply involves the tourist scanning an icon for a particular point of interest with the dependent communication device. When the optical reader detects the optical code embedded in icon, it instructs the dependent communication device to play the audio commentary for that point of interest in the particular language selected by the tourists.

The second, more complicated but also more useful, method requires that a dependent communication device operated by a tourist be coupled to a primary communication device operated by a tour guide. To do this, both the tour guide and the tourist utilize a channel map and a channel library stored within the communication devices.

Figure 12:
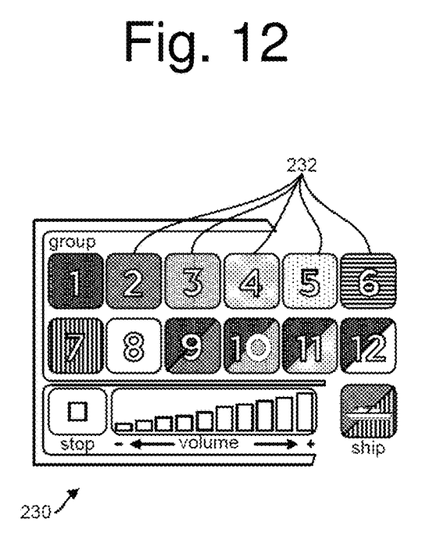
FIG. 12 is a top plan view of a channel selecting card in accordance with principles of the invention.

A communication channel library is also stored in the storage module of each communication device. The channel library is composed of optical codes corresponding to different channels of a DECT communication system. FIG. 12 shows a channel map 230 of colored panels 232. Each colored panel 232 has an embedded optical code corresponding to a particular channel within the DECT system. In this embodiment, the color panels 232 of the channel map 230 also include numbers. Both colors and numbers may be utilized to identify particular DECT channels on a channel map. Colors may be preferred when one or more tourists are not familiar with Arabic numerals.

Figure 13:
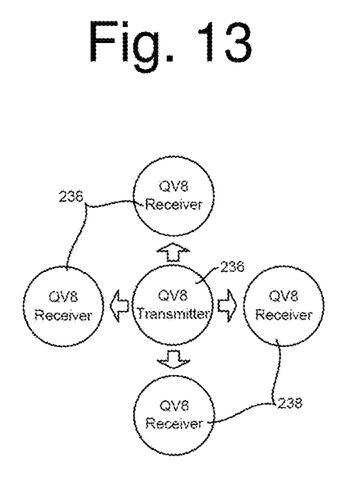
FIG. 13 is a diagram of a DECT system having a transmitting device and for receiving devices.

A tour guide scans one of the colored panels 232 of the channel map 230 with the optical reader of the primary communication device. Similarly, the tourists also scan the same color panel 232 of the channel map 230 with the optical readers of the dependent communication devices. The microcontrollers in the communications devices then use the channel library to identify the proper channel over which to establish a DECT communication network as shown in FIG. 13. The primary communications device 236 is instructed to transmit a signal to initiate a new DECT network with any dependent communications devices 238 within its range. Similarly, the dependent communications devices, upon reading the optical code of a colored panel, will respond to the signal transmitted by the primary communications device 236 because it has been keyed to the same channel. The primary communications device 236 will then identify the receiving addresses of the various dependent communications devices 238. The dependent communications devices 238 will also record the transmitting address of the primary communications device 236. All of the devices 236 and 238 will maintain the established and secure DECT communications channel so long as they remain within range of each other. If a deep pendant device 238 falls out of range of the primary device 236, it will continue to attempt to reestablish the connection on the same channel until it is turned off or the tourist scans a new colored panel 232 attempting to couple with a new primary communication device on a different channel.

If several tour groups are starting simultaneously, different tour groups, each containing a single tour guide and a plurality of tourists, can begin simultaneously by each selecting a different DECT channel. An indicator light on the dependent communication devices will be actuated to notify tourists when their particular dependent communication devices have properly coupled to the primary communication device held by their tour guide. If during a tour, a tourist wishes to switch to a different tour group, he or she may do so by scanning a different colored panel and thereby establishing a connection with a different tour guide.

Once a channel has been established between a tour guide using a primary communication device 236 and tourists using the dependent communication devices 238, a tour may begin. A tour guide may provide live commentary directly by speaking in to the microphone on the primary communication device. This may be helpful if some or all of the tourists speak the same language as the tour guide.

However, if the tour guide does not speak the same language as the tourists, there is no substantial benefit to such live commentary. In that case, the tour guide can use a map such as the map shown in FIG. 4 to provide commentary. A tour guide scans an icon corresponding to a point of interest using the primary communication device 236. This sends a triggering signal to each of the dependent communication devices 238 instructing them to play the audio commentary found in the audio library which corresponds to the point of interest selected by the tour guide and the language selected by the tourist. In this manner, a tour guide may provide an enjoyable and valuable tour of several points of interest to several tourists in several different languages. A tour guide may successfully provide a tour to a group of tourists even though none of them speak the same language.

When tourists are left to themselves in a Museum or other area having multiple points of interest, it is common for tourists to either intentionally or accidentally guide themselves among the points of interest in a random or non-optimal manner. With the tour guide method of the present invention, the tourists are led between points of interests in a preferred order and with little or no confusion because a tour guide is guiding them.

Figure 14:
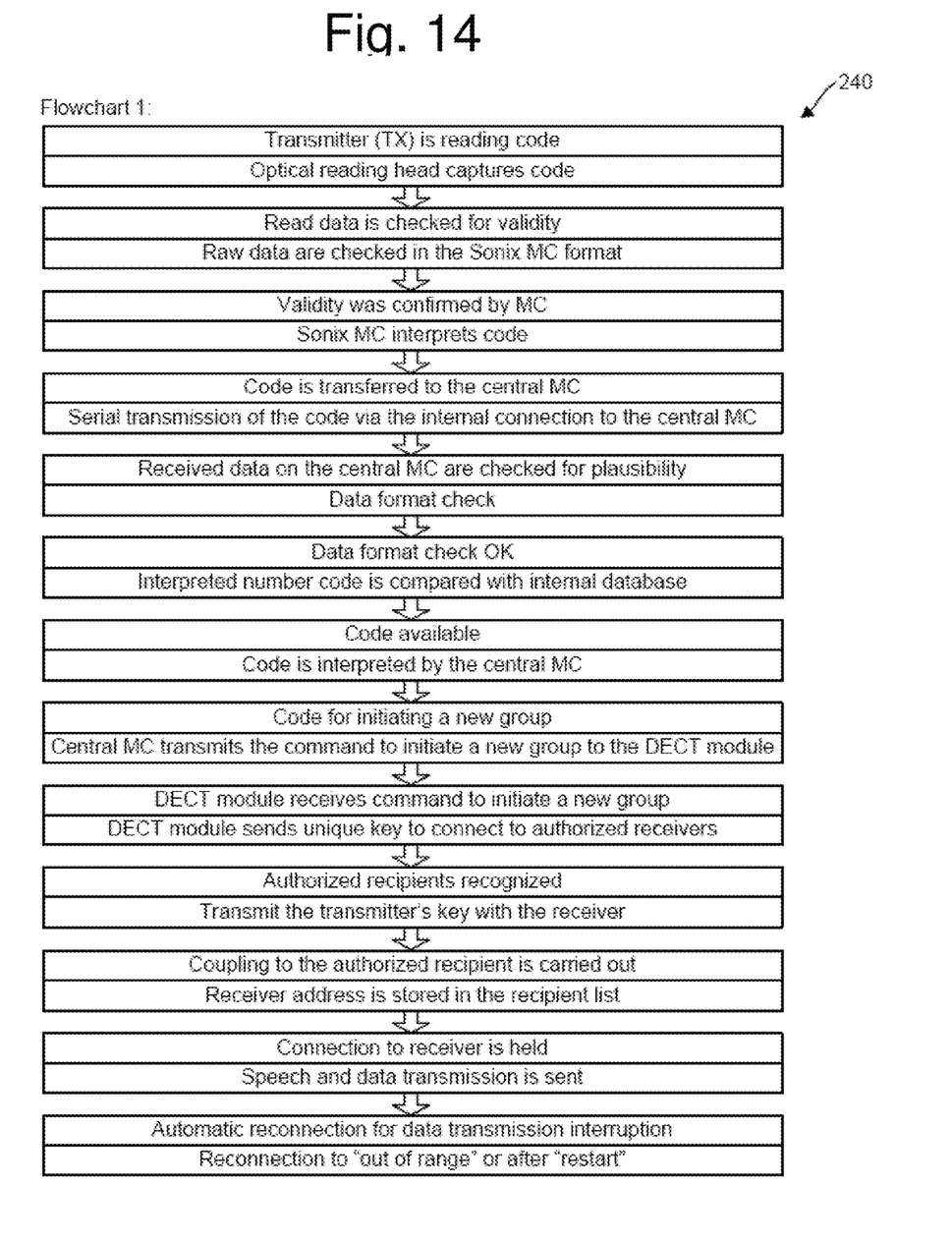
FIG. 14 is a flowchart of a method of initiating a DECT system transmitting device in accordance with the principles of the invention.
Figure 15:
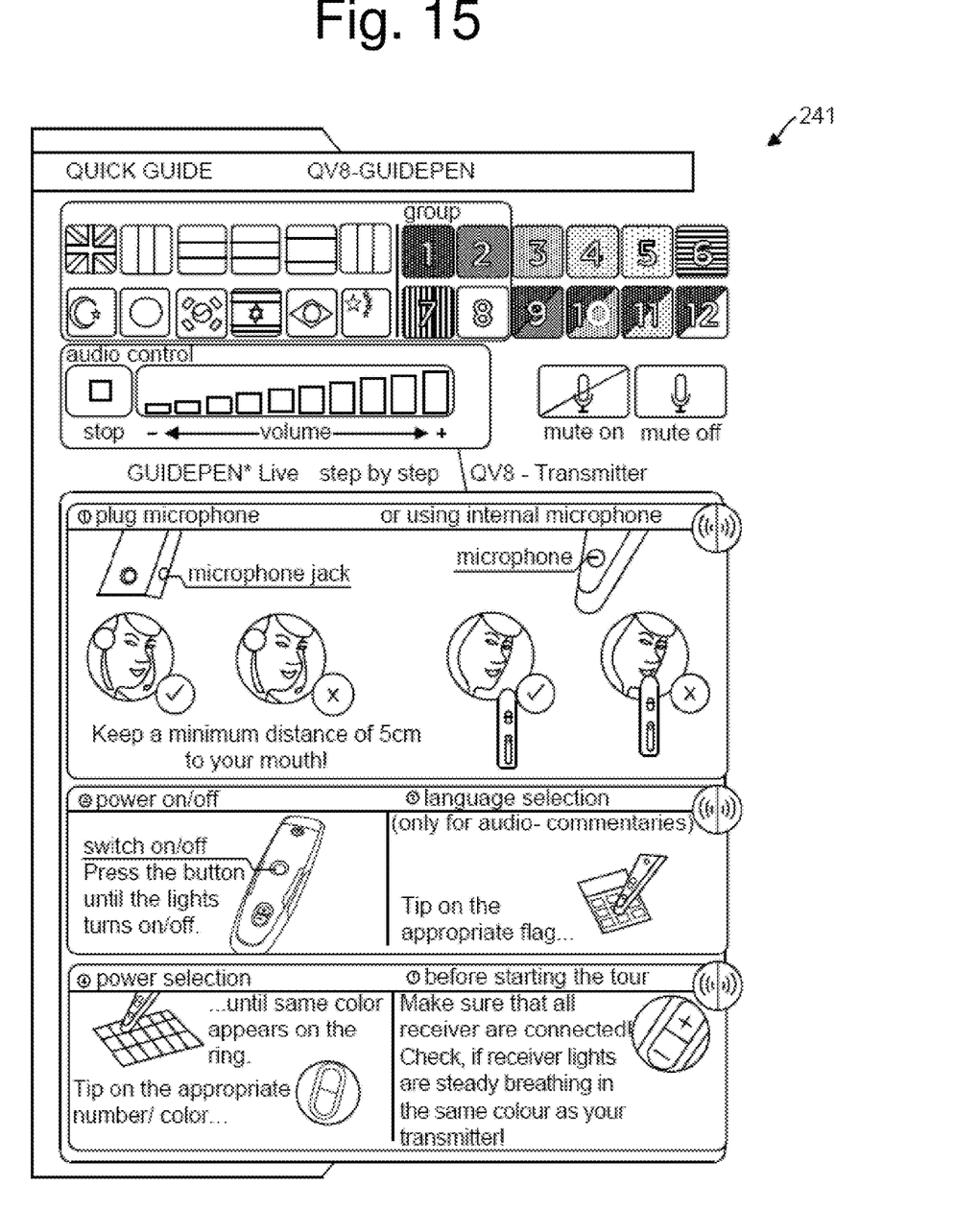
FIG. 15 is an instruction guide for initiating a transmitting device in accordance with the principles of the invention.

FIG. 14 shows a flowchart 240 of the method used by a DECT system base station used as a digital audio communication transmission device. FIG. 15 shows an exemplary instruction sheet 241 for a tour guide. To begin using a digital audio communication transmission device as a DECT system base station for use in accordance with the principles of the invention, the transmission device is turned on. A tour guide then uses the optical reader to scan a particular optical code, which is generally in printed in a color bar as described above. The transmission device then interprets the code and compares it to a library of possible codes contained within its storage module. If the optical code is correctly identified, the control module initiates a new group for the transmission device. The transmission device then sends a unique key over a particular DECT channel that is matched to the optical code read by the transmission device. Any authorized receiving playback device will receive the emitted unique key and sends a return signal that provides a receiver address for that playback device. The transmission device and thus builds an address list of properly coupled receiving devices. The transmission device and receiving device exchange signals periodically to verify that the connection remains open. If the transmission device and receiving device lose their connection, the intermittent signals will allow them to automatically reconnect without requiring the two devices to re-couple.

Figure 16:
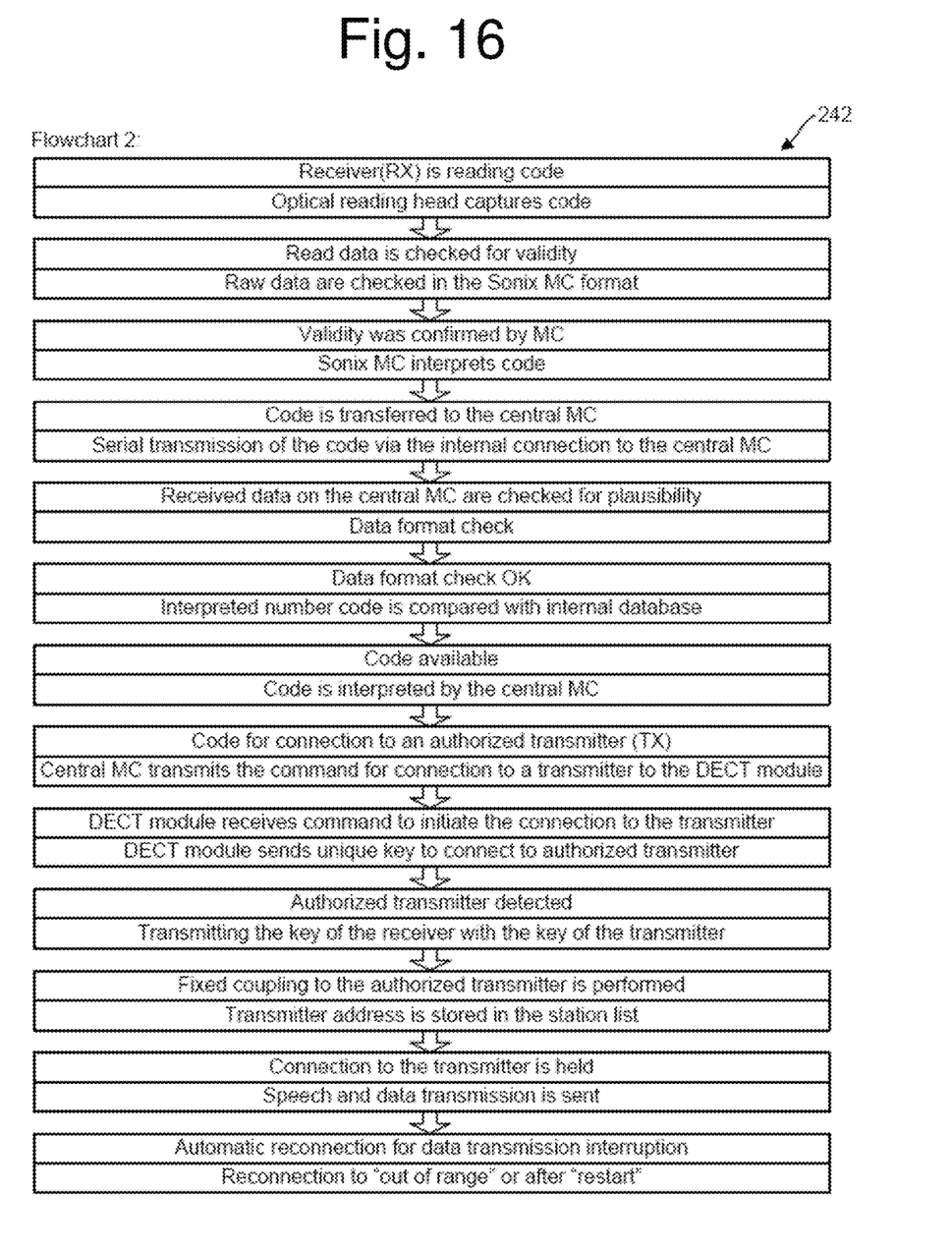
FIG. 16 is a flowchart of a method of initiating a DECT system receiving device in accordance with the principles of the invention.
Figure 17:
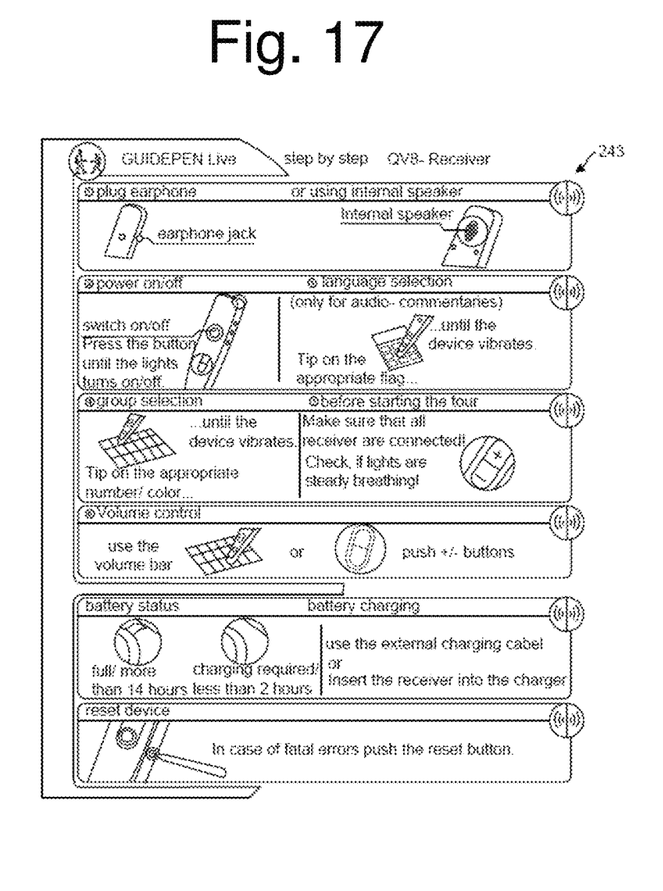
FIG. 17 is an instruction guide for initiating a receiving device in accordance with principles of the invention.

FIG. 16 shows a flowchart 242 of the method used by a digital audio communication playback device acting as a DECT receiver. FIG. 17 shows an instruction sheet 243 to assist tourists in properly setting up a dependent communication device. When the receiving device is turned on, it's optical reader is used to read a particular optical code, for example embedded in a color bar. The optical code is interpreted and transmitted to the microcontroller within the receiving device. The receiving device microcontroller then matches the optical code to a matching DECT channel according to a library in its storage module. The receiving device then transmits a command for connection to a transmitter. The transmitter that receives the signal then sends the receiving device and identifying transmitter address so that the devices may be coupled. The transmitter address is then stored in the receiving devices station list. The operator of the receiving device also scans an optical code, for example one embedded in the image of a country's flag, that the receiving device can match to a language according to a library in its storage module.

Once a transmitting device and receiving device have been coupled according to the methods shown in FIGS. 14 and 16, the transmitting and receiving devices may transmit speech and data signals to each other. The transmitting device may transmit either an audio signal provided by the microphone of the transmitting device, or may transmit a signal instructing a receiving device to play back an audio signal stored in the receiving device's storage module. When a receiving device receives a signal to playback of an audio signal stored in its storage module, it selects the particular audio signal corresponding to the language selected by the operator of the receiving device.

The operator of the receiving device may adjust the volume of audio playback or audio signal received from the transmitting device. The operator of the receiving device may also change the selected language at any time by scanning a different optical code using the receiving device's optical reader. If a transmitting device authorizes it, a receiving device may record an audio signal using its microphone and transmit that audio signal, in real time or otherwise, to the transmitting device. The transmitting device may then play the audio signal and the operator of the transmitting device may respond to the particular receiving device that sent the original audio signal. This allows a tour guide to use the transmitting device to answer questions. The tour guide utilizing the transmitting device may optionally provide an answer to a particular tourist's question to the entire tour group or only to the tourist to pose the question. The tour guide operating the transmitting device may also scan an optical code, which may be embedded in a photograph of a particular point of interest. Scanning the optical code may automatically generate a triggering signal to all of the receiving devices. The triggering signal causes the receiving device to play back an audio recording corresponding to the point of interest in the language selected by the operator of the receiving device. The use of the optical reader allows tourists of even the most limited capacity to accurately and efficiently operate a receiving device. A tourist does not need to be literate nor does he or she need to speak any particular language in order to scan an optical code and couple to a desired transmitting device and bypass atypically more complicated coupling process. A tourist also selects a language by simply identifying a country flag corresponding to a desired language. The system also allows a tour guide speaking a first language to easily and successfully conduct a tour leading several tourists which may speak a second language, a third language, a fourth language, etc. while still providing a complete and enjoyable tour experience to every tourist. Thus a tour guide and group of tourists may all be unable to effectively communicate because they all speak different languages, but still all successfully experience a tour tailored to each tourist's specific language. This avoids the necessity of splitting tour groups up according to language. It also simplifies the business of conducting tours because it is no longer necessary for a tour guide to speak two or more languages. The invention also provides consistency of tour experience and prevents miscommunication.

The use of a DECT system ensures that each tour group has its own reserved specific channel so that signals are clear and there is practically no interference. This advantage may be particularly appreciated when tourists ask questions using the microphone of a receiving device and a tour guide supplies answers. Wi-Fi and other signals may become sporadic or drops if the Wi-Fi is not strong, is being overused, or is in a crowded location. None of these problems affect a tour conducted using a DECT system. The limited range is not a problem because tour groups usually stay well within 100 feet of each other. However, if a particular tourist become separated from his or her group, or simply chooses to switch to another group, he or she may simply scan a new color bar corresponding to a newly selected tour. Optionally, a DECT system may be modified to limit or expand the number of receiving devices. Optionally, the DECT system may also be modified to increase or decrease its effective range. DECT systems usually utilize a base station, or a transmitting device when used in accordance with the principles of the invention, designed to couple with a finite number of receiving devices. This may also be adjusted as desired.

Figure 18:
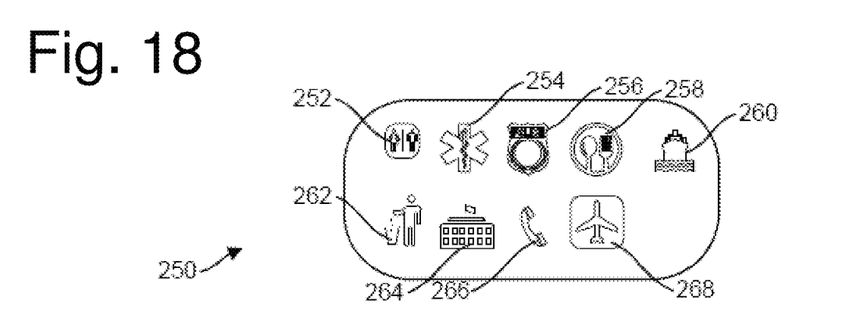
FIG. 18 is a top plan view of an emergency map in accordance with principles of the invention.

FIG. 18 shows an emergency map 250 that may also be provided to tourists for use with a dependent communication device. The emergency map 250 may include icons for different places and services that may be required. For example, this map 250 includes an icon for a bathroom 252, medical services 254, police 256, food 258, the location of the cruise ship 260, waste receptacles 262, an embassy 264, a telephone 266, and an airport 268. If a tourist becomes lost or needs assistance, he or she may use the optical reader of his or her device to scan a national flag image on a language map and then scanned the appropriate icon on the emergency map 250. The dependent device will then broadcast an inquiry regarding the desired service or location in the language selected. For example, if a person speaking English needs to find the bathroom in a country where German is spoken, the tourist may scan the German flag icon to indicate the German language, and then scan the bathroom icon 252. This will cause the dependent communication device to broadcast through its speaker the question "where is the bathroom?" in German. This may assist the tourist in finding a bathroom.

Whereas, the present invention has been described in relation to the drawings attached hereto, other and further modifications, apart from those shown or suggested herein, may be made within the spirit and scope of this invention. Descriptions of the embodiments shown in the drawings should not be construed as limiting or defining the ordinary and plain meanings of the terms of the claims unless such is explicitly indicated. The conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The invention claimed is:

1. A method of conducting a guided tour comprising:
providing a tour library having a first plurality of optical reader codes, each optical reader code corresponding to a point-of-interest to be viewed during a guided tour,
providing an audio library having pre-recorded audio descriptions in a plurality of languages for each of the points-of-interest;
providing a language library having a second plurality of optical reader codes corresponding to each of the plurality of languages;
providing a channel library having a third plurality of optical reader codes, each corresponding to a wireless communication channel;
providing a handheld primary audio communication device having a body, an optical reader, a microcontroller, a storage module, a transmitter, a haptic feedback device, a microphone, a speaker, an inductive charging mechanism, an indicator light, a power button, and a volume control switch, wherein the tour library, the audio library, the language library and the channel library are stored on the storage module;
providing one or more handheld dependent audio communication devices each having a body, an optical reader, a microcontroller, a storage module, a transmitter, a haptic feedback device, a connection indicator light, a speaker, an inductive charging mechanism, a power indicator light, a power button, and a volume control switch, wherein the tour library, the audio library, the language library and the channel library are stored on the storage module, and wherein the one or more dependent audio communication devices communicate only with the primary audio communication device and are not capable of communicating with other dependent audio communication devices;
providing a physical tour map having a plurality of images, wherein each image corresponds to one of the points-of-interest and has an embedded optical code selected from the tour library and corresponding to the same point-of-interest;
providing a physical language map having a plurality of national flag images, each national flag image having an embedded optical code selected from the language library;
providing a physical channel map having a plurality of colored panels, each colored panel having an optical code selected from the channel library;
providing a tour guide with the primary communication device, the physical tour map library and the physical channel map library;
providing one or more tourists with a dependent communication device, a physical language map library and the physical channel map library;
coupling the primary communication device with the one or more dependent communication devices by scanning one of the colored panels of the channel map with the optical reader of the primary communication device, and instructing the one or more tourists to scan the same colored panel of the channel map, thereby automatically coupling the primary communication device with the one or more dependent communication devices; wherein successful coupling is confirmed by actuating the connection indicator light on the one or more dependent communication devices;
instructing the one or more tourists to scan a national flag image corresponding to the tourist's preferred language, thereby programming the tourist's dependent communication device to play only audio descriptions of points-of-interest from the audio library in the preferred language;
the tour guide leading the one or more tourists on a tour that includes visiting at least one of the points-of-interest;
when one of the points-of-interest is visited along the tour, the tour guide transmits a triggering signal from the primary communication device to the one or more dependent communication devices instructing each of the dependent communication devices to play the audio description of the point-of-interest in the language selected by the one or more tourist.

2. The method of conducting a guided tour of claim 1 wherein the channel library comprises channels of a DECT communication system.

3. The method of conducting a guided tour of claim 2 further comprising the tour guide providing live audio commentary by speaking into the microphone of the primary communication device, transmitting the commentary to the one or more dependent communication devices, and emitting the audio commentary from the speakers of the one or more dependent communication devices.

4. The method of conducting a guided tour of claim 3 wherein the one or more dependent communication devices further comprises a microphone, and wherein the method further comprises one or more tourists asking the tour guide a question by speaking in to the microphone of the dependent communication device, transmitting the question to the primary communication device, and emitting the question from the speaker of the primary communication device.

5. The method of conducting a guided tour of claim 4 wherein the connection indicator lights of the one or more dependent communication devices blink if it decouples from the primary communication device is broken, and the one or more dependent communication devices automatically continuously attempt to re-couple with the primary communication device.

* * * * *